United States Patent [19]

Bacher et al.

[11] 4,434,139

[45] Feb. 28, 1984

[54] METHOD FOR REMOVING ADHERING OR DUST-LIKE DEPOSITS IN SYSTEMS HANDLING URANIUM HEXAFLUORIDE

[75] Inventors: Walter Bacher, Stutensee; Eberhard Jacob, Feldafing, both of Fed. Rep. of Germany

[73] Assignees: Kernforschungszentrum Karlsruhe GmbH, Karlsruhe; Maschinenfabrik Augsburg-Nürnberg AG, Munich, both of Fed. Rep. of Germany

[21] Appl. No.: 242,252

[22] Filed: Mar. 10, 1981

[30] Foreign Application Priority Data

Mar. 14, 1980 [DE] Fed. Rep. of Germany ....... 3009933

[51] Int. Cl.³ .............................................. C01G 43/06
[52] U.S. Cl. ...................................... 423/19; 423/258
[58] Field of Search .................................. 423/19, 258

[56] References Cited

U.S. PATENT DOCUMENTS

| | | | |
|---|---|---|---|
| 2,865,704 | 12/1958 | Jaffey et al. | 423/19 |
| 3,294,493 | 12/1966 | Jonke et al. | 423/19 |
| 3,353,928 | 11/1967 | Woyski et al. | 423/19 |
| 3,925,062 | 12/1975 | Trombe et al. | 423/19 |
| 4,311,678 | 1/1982 | Jacob et al. | 423/19 |

*Primary Examiner*—Edward A. Miller
*Attorney, Agent, or Firm*—Spencer & Frank

[57] ABSTRACT

A process for removing adhering or dust-like deposits in an apparatus which handles uranium hexafluoride. The process includes the steps of:
(a) reacting the deposits with a gaseous boron halogenide other than boron trifluoride, to form at least one uranium halogenide; and
(b) reacting the at least one uranium halogenide with a fluorine containing substance to form uranium hexafluoride.

6 Claims, No Drawings

METHOD FOR REMOVING ADHERING OR DUST-LIKE DEPOSITS IN SYSTEMS HANDLING URANIUM HEXAFLUORIDE

BACKGROUND OF THE INVENTION

The present invention relates to a method for removing adhering or dust-like deposits in an apparatus handling uranium hexafluoride by reconverting the deposits to $UF_6$.

In systems for handling uranium hexafluoride, particularly in systems for $U^{235}$ enrichment, costly operational malfunctions may be caused by certain deposits of uranium compounds. A method is disclosed in German Pat. No. 2,504,840 for the removal of such deposits by treating the parts of the system involved with iodine heptafluoride $IF_7$ at temperatures of about 293° K or more. This method can be used successfully if the deposits consist mainly of reduction products of $UF_6$, such as $UF_5$, $U_2F_9$ or $UF_4$. If oxygen containing uranium compounds such as uranyl fluoride $UO_2F_2$ and its hydrates are present, however, removal of the deposits with $IF_7$ will remain incomplete.

By treating the deposits with $ClF_3$ it is possible to remove them completely. At temperatures in the range from 353° to 363° K, this removal occurs at a desirable speed and at 323° K, the removal occurs only at a lesser speed. However, at lower temperatures there is danger that, in the presence of water containing uranyl fluoride, $ClF_3$ will hydrolyze to form highly explosive $ClO_2$.

SUMMARY OF THE INVENTION

It is an object of the present invention to provide a method for removing adhering or dust-like deposits from an apparatus handling $UF_6$.

It is a further object of the present invention to provide a method for removing adhering or dust-like deposits which satisfactorily removes oxygen-containing deposits such as $UO_2F_2$ and its hydrates without the disadvantages associated with the use of $ClF_3$.

To achieve these objects, and in accordance with its purpose, the present invention provides a process for removing adhering or dust-like deposits in a vessel of an apparatus which handles uranium hexafluoride, including the steps of:

(a) reacting the deposits with a gaseous boron halogenide other than boron trifluoride, to form at least one uranium halogenide; and (b) reacting the at least one uranium halogenide with a fluorine-containing substance to form uranium hexafluoride.

It is to be understood that both the foregoing general description and the following detailed description are exemplary, but are not restrictive of the invention.

DETAILED DESCRIPTION OF THE INVENTION

The process of the invention applies to deposits which typically form in an apparatus which handles $UF_6$, such as U-235 enrichment plants or parts thereof.

These deposits include such compounds as $UF_5$, $U_2F_9$, $UF_4$, $UO_2F_2$, hydrated $UO_2F_2$, and mixtures of these.

In the process of the present invention, these deposits are reacted with a gaseous boron halogenide other than boron trifluoride which is not suitable because it does not react with U-fluorides or -oxide fluorides. Such boron halogenides include $BBr_3$. $BCl_3$ can be used if only oxygen free compounds are present. This reaction may take place at room temperature, over a duration of 2 to 8 hours, generally about 6 hours.

At increased temperatures the exchange reaction will proceed faster and the duration of the reaction can be reduced.

The quantity of the boron halogenide used can be determined from its partial pressure. The boron halogenide is used at a pressure of 20–100 mbars at room temperature, and the end of the exchange reaction is indicated by the end of the pressure drop and a constant partial pressure of the boron halogenide. The products of the exchange reaction are uranium bromides or uranium bromo fluorides. The stoichiometry of the products has not been exactly determined.

At the end of this reaction, the remaining boron halogenide is pumped out of the vessel, leaving various uranium halogenides in solid form. The various uranium halogenides formed in the reaction with the boron halogenide are then reacted by introducing a gaseous fluorine-containing substance into the vessel. Elemental fluorine is preferred as the fluorine-containing substance because of it is relatively easy to handle and is a low price chemical, but iodine heptafluoride and other halogen fluorides may also used.

The fluorine containing substance can be applied in a partial pressure range of 10 to 1000 mbars. The minimum amount of the fluorine containing substance has to exceed the stoichiometric amount given by the uranium deposits.

This reaction may also take place to room temperature, and will generally take about 0,5 to 2 hours. At the end of this reaction, the various uranium halogenides will have been completely converted to gaseous $UF_6$, which may then be pumped out of the vessel.

According to an advantageous embodiment of the invention, the deposits are activated before reaction with the boron halogenide, by reacting them for 0,5 to 2 hours with gaseous phosphorus tribromide $PBr_3$ at a pressure of a few mbars, typically 3 mbars. Such activation has been found to be particularly satisfactory when the deposits are of the $UO_2F_2.nH_2O$ type. By this reaction it can be avoided that the boron halogenide used in the exchange reaction is hydrolyzed by the water content of the $UO_2F_2.nH_2O$. The products of the reaction have not been identified.

The method according to the invention is particularly advantageous in that it can be practiced at room temperature and with relatively low partial pressures of the substances employed, and without the formation of explosive mixtures.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

3.2 g of anhydrous $UO_2F_2$ were placed at the bottom of a 15 liter stainless steel reaction vessel equipped with a sapphire observation window. The reaction vessel was charged at room temperatures with 50 mbar of gaseous $BBr_3$. After about six hours, the uranium-containing deposits present were colored a blackish brown and the remaining $BBr_3$ was pumped out of the vessel. By introducing 130 mbar fluorine at room temperature, the deposits were completely volatilized within one hour, forming in addition to $UF_6$ and $BrF_5$, smaller quantities of $BF_3$.

An analogous experiment utilizing uranyl fluoride hydrate $UO_2F_2 \cdot (0.7-1.2)H_2O$ in place of the anhydrous fluoride did not produce satisfactory results. No halogen exchange had taken place between $BBr_3$ and the uranyl fluoride hydrate.

EXAMPLE 2

2.3 g $UF_6$ were hydrolyzed with steam in a 15 liter stainless steel reaction vessel equipped with a sapphire observation window. The resulting fog of 'hydrolysis dust' having the formula $UO_2F_2 \cdot (0.7-1.2) H_2O$ was deposited predominantly at the bottom of the reaction vessel.

The vessel was now charged at room temperature with 3.3 mbar of gaseous phosphorus tribromide. After a reaction period of 0.5 hour, the $PBr_3$ was pumped out to a residual pressure of 0.7 mbar.

The vessel was then charged at room temperature with 54 mbar of gaseous boron tribromide $BBr_3$. After a reaction period of 6 hours, the uranium-containing deposits were colored a blackish brown. All gaseous substances were pumped out of the vessel, until the pressure was $10^{-3}$ mbar.

By introducing 107 mbar of fluorine at room temperature, the deposits were completely volatilized in one hour. Infrared analysis of the gaseous products of the reaction indicated the presence of $UF_6$ and $BrF_5$ in addition to smaller quantities of $BF_3$ or mixed boron halogenides, and $PF_5$, which were pumped out of the vessel.

Infrared analysis indicated that no explosive products were formed with the use of the method according to the invention.

It will be understood that the above description of the present invention is susceptible to various modifications, changes and adaptions, and the same are intended to be comprehended within the meaning and range of equivalents of the appended claims.

We claim

1. A process for removing adhering or dust-like deposits in an apparatus which handles uranium hexafluoride, comprising the steps of:
   (a) reacting said deposits with a gaseous boron halogenide other than boron trifluoride, to form at least one uranium halogenide; and
   (b) reacting said at least one uranium halogenide with a fluorine-containing substance to form uranium hexafluoride.

2. A process as defined in claim 1, wherein said fluorine-containing substance is fluorine.

3. A process as defined in claim 1 or 2, additionally comprising the step of reacting said deposits with gaseous phosphorus tribromide prior to said step of reacting said deposits with a gaseous boron halogenide.

4. A process as defined in claim 3, wherein said adhering or dust-like deposits comprise hydrated $UO_2F_2$.

5. A process as defined in claim 1 or 2, wherein said boron halogenide comprises boron tribromide.

6. A process as defined in claim 1 or 2, wherein said deposits comprise $UF_5$, $U_2F_9$, $UF_4$, $UO_2F_2$, hydrated $UO_2F_2$ or mixtures thereof.

* * * * *